(12) United States Patent
Dinter

(10) Patent No.: US 12,338,888 B2
(45) Date of Patent: Jun. 24, 2025

(54) SPACE-SAVING GEARBOX COOLER DEVICE AND GEARBOX

(71) Applicant: Flender GmbH, Bocholt (DE)

(72) Inventor: Ralf Dinter, Bocholt (DE)

(73) Assignee: Flender GmbH, Bocholt (DE)

( * ) Notice: Subject to any disclaimer, the term of this patent is extended or adjusted under 35 U.S.C. 154(b) by 0 days.

(21) Appl. No.: 18/569,987

(22) PCT Filed: Jul. 22, 2022

(86) PCT No.: PCT/EP2022/070582
§ 371 (c)(1),
(2) Date: Dec. 13, 2023

(87) PCT Pub. No.: WO2023/006594
PCT Pub. Date: Feb. 2, 2023

(65) Prior Publication Data
US 2024/0280169 A1    Aug. 22, 2024

(30) Foreign Application Priority Data

Jul. 26, 2021 (EP) .................................... 21187610

(51) Int. Cl.
*F16H 57/04* (2010.01)
(52) U.S. Cl.
CPC ............................... *F16H 57/0416* (2013.01)
(58) Field of Classification Search
CPC .................................................. F16H 57/0416
See application file for complete search history.

(56) References Cited

U.S. PATENT DOCUMENTS 10,690,232 B2 *  6/2020  Liou ................... F16H 57/0416
11,287,025 B2 *  3/2022  Rakuff ..................... F16H 57/02
(Continued)

FOREIGN PATENT DOCUMENTS

CN        116336171 A  *  6/2023
DE    102016105130 A1     10/2016
(Continued)

OTHER PUBLICATIONS

International Search Report Issued on Sep. 22, 2022 by the European Patent Office in International Application PCT/EP2022/070582.

*Primary Examiner* — Adam D Rogers
(74) *Attorney, Agent, or Firm* — Henry M. Felereisen LLC

(57) ABSTRACT

A transmission cooling device includes a transmission housing part for housing rotating transmission elements and a fan, which is connected to the transmission housing part, for providing a cooling air flow against an outer side of the transmission housing part. The fan has a conveying element, which communicates with a hollow fan ring, for generating an operating flow within the fan ring. The fan ring communicates via at least one discharge opening with a volume provided radially within the fan ring in such a way that the operating flow generates the cooling air flow by a suction jet effect. Indirectly generating the cooling air flow with the aid of the operating flow generated by the conveying element in the hollow fan ring results in good cooling with a large flow cross section of the cooling air flow with small installation space requirement, thereby enabling space-saving cooling of a transmission.

17 Claims, 4 Drawing Sheets

(56) References Cited

U.S. PATENT DOCUMENTS

| | | | |
|---|---|---|---|
| 11,619,294 B2 * | 4/2023 | Völker et al. | ........... F16H 57/02 |
| | | | 415/121.3 |
| 2012/0230831 A1 | 9/2012 | Abe et al. | |
| 2019/0368595 A1 | 12/2019 | Liou et al. | |

FOREIGN PATENT DOCUMENTS

| | | | | |
|---|---|---|---|---|
| EP | 2410210 A1 * | 1/2012 | ............. | F04D 17/06 |
| EP | 3 576 263 A1 | 12/2019 | | |
| WO | WO 2011/071042 A1 | 6/2011 | | |

\* cited by examiner

SPACE-SAVING GEARBOX COOLER DEVICE AND GEARBOX

CROSS-REFERENCES TO RELATED APPLICATIONS

This application is the U.S. National Stage of International Application No. PCT/EP2022/070582, filed Jul. 22, 2022, which designated the United States and has been published as International Publication No. WO 2023/006594 A1 and which claims the priority of European Patent Application, Serial No. 21187610.7, filed Jul. 26, 2021, pursuant to 35 U.S.C. 119 (a)-(d).

BACKGROUND OF THE INVENTION

The invention relates to a transmission cooling device, with the aid of which a transmission can be cooled in a space-saving manner, and to a transmission having a transmission cooling device of this kind.

WO 2011/071 042 A1 discloses a fan, which is connected to an input shaft, for cooling a transmission.

US 2019/0368595 A1 discloses providing a transmission, against which air from a radial fan flows, with a hood, so that an annular gap is formed between a transmission housing of the transmission and the hood. The cooling flow flowing in from the radial fan in the axial direction can be directed along the surface of the transmission housing via the annular gap. The hood has further openings downstream, so that the cooling flow can draw in further air from radially outside the hood by means of a suction jet effect. The annular gap is delimited radially on the inside by the surface of the transmission housing over its entire axial extent.

There is a constant need to implement cooling of a transmission in as space-saving a manner as possible.

The object of the invention is to show measures that enable space-saving cooling of a transmission.

SUMMARY OF THE INVENTION

The object is achieved by a transmission cooling device as set forth hereinafter and by a transmission as set forth hereinafter. Preferred refinements are specified in the dependent claims and the following description, which can each represent an aspect of the invention individually or in combination. If a feature Is presented in combination with another feature, this serves only for simplified illustration of the invention and is in no way Intended to mean that this feature cannot also be a development of the invention without the other feature, the scope of protection of the invention being defined by the independent claims.

One embodiment relates to a transmission cooling device having a transmission housing part for housing rotating transmission elements, a fan, which is connected to the transmission housing part, for providing a cooling air flow against an outer side of the transmission housing part, and a hollow fan ring, wherein the fan has a conveying element, which fluidically communicates with the fan ring, for generating an operating flow within the fan ring, wherein the fan ring fluidically communicates via at least one discharge opening with a volume provided radially within the fan ring and through which the cooling air flow can flow, wherein the discharge opening is oriented, in particular at least with a component in the tangential direction in relation to the cooling air flow, in such a way that the operating flow, which flows out via the discharge opening, generates the cooling air flow by means of a suction jet effect. In particular, a volume flow of the cooling air flow is composed at least of a volume flow of the operating flow and a volume flow of the ambient air carried along by the operating flow owing to the suction jet effect.

The discharge opening may be a cutout, for example at least one opening delimited in the circumferential direction and/or a gap entirely or partially closed in the circumferential direction, in the fan ring, a flow starting within the hollow fan ring being able to flow through said cutout, in particular with a movement component radially on the inside and/or with a movement component in the tangential direction of the cooling air flow, and being able to flow into the volume that is kept free radially within the fan ring. The flow velocity of the flow flowing through the discharge opening can depend substantially on the pressure within the hollow fan ring, in particular on the pressure of the operating flow. The operating flow can flow in particular along the cavity in the fan ring substantially in a circle, wherein a portion of the operating flow is guided through the discharge opening owing to an increasing pressure in the interior of the fan ring and/or with the aid of a suitable guide element in the interior of the fan ring, in order to generate the cooling air flow with the aid of the suction jet effect. The cooling air flow striking the outer side of the transmission housing part for cooling a transmission is composed of the air flow drawn in by the conveying element and forming the operating flow within the fan ring and the air flow that is carried along by the proportion of the operating flow discharged via the discharge opening owing to the suction jet effect. The volume flow of the cooling air flow is thus greater than the air flow drawn in by the conveying element, so that, in comparison to a direct flow of the air flow drawn in by the conveying element against the outer side of the transmission housing part, a significantly higher cooling capacity is produced owing to the indirect flow of the cooling air flow composed of the sum of the discharged operating flow and the ambient air carried along on the fan ring against the outer side to be cooled. In addition, it is possible to position the conveying element in a manner spaced apart from the fan ring and the outer side of the transmission housing part to be cooled and to guide the air drawn in by the conveying element to the fan ring via at least one connecting channel. As a result, the conveying element does not need to be positioned in the flow path of the cooling air flow. The conveying element can thus be moved to a less space-critical installation space where the conveying element cannot hit other internals. By indirectly generating the cooling air flow with the aid of the operating flow generated by the conveying element in the hollow fan ring, good cooling can be achieved with a large flow cross section of the cooling air flow with a small installation space requirement, so that space-saving cooling of a transmission is possible.

The conveying element can be readily arranged in an installation space where good air supply and/or air discharge can be achieved at the lowest possible temperature. At least one connecting channel between the conveying element and the fan ring can preferably be guided along the transmission housing part and/or a further transmission housing part, so that additional convective cooling can be performed by means of the air conveyed in the connecting channel by the conveying element. The conveying element can be electrically and/or mechanically driven. For example, the conveying element is part of a radial and/or axial fan which communicates with the fan ring. It is also possible to provide more than one conveying element, these conveying elements communicating with the fan ring in series and/or parallel in relation to each other.

The fan ring can be round, in particular circular, elliptical, provided with a variable radius or angular, for example rectangular. The fan ring can have an inner lateral surface facing the cooling air flow, in particular closed in the circumferential direction, and an outer lateral surface facing outward in the opposite radial direction. The inner lateral surface and the outer lateral surface can be connected to each other via end sides, wherein transitions between the respective lateral surface and the respective end side are preferably adapted in terms of flow, in particular rounded, in particular to provide a lowest possible flow resistance for air taken in and contributing to the cooling air flow. An axial direction is understood to be an axial direction if the fan ring were circular, regardless of whether the fan ring is actually circular. The axial direction corresponds substantially to the flow direction of the cooling air flow when passing the fan ring. A radial direction is understood to be a direction within a plane extending perpendicular to the axial direction. A circumferential direction of the fan ring is understood to be a direction along the annular extent of the fan ring, the circumferential direction being at a constant distance from a center point coinciding with the axial direction center point given a circular design of the fan ring.

The fan ring is hollow and has an interior running in the circumferential direction of the fan ring, in which interior the operating flow can be formed. The interior of the fan ring can be annularly closed, in particular in the circumferential direction of the fan ring. The fan ring can have at least one passage, via which the conveying element can communicate with the interior. The interior has a substantially constant flow cross section in particular in the circumferential direction of the fan ring at least over a large portion of its extent in the circumferential direction. As an alternative, the flow cross section can taper in the circumferential direction along the flow direction of the operating flow, preferably in such a way that, taking into account the component of the operating flow exiting via the discharge opening, substantially constant flow conditions, in particular a substantially constant flow velocity of the operating flow in the circumferential direction, are maintained for the proportion of the operating flow flowing in the circumferential direction along the flow direction of the operating flow. The flow cross section of the interior is preferably designed in the circumferential direction in such a way that similar, in particular substantially symmetrical, flow conditions are produced between the cooling air flow and the operating flow in the circumferential direction of the fan ring, these flow conditions allowing in particular an almost exact orientation of the cooling air flow in the axial direction. A suitable fan ring is described, for example, in EP 2 333 349 A1.

The at least one discharge opening in the fan ring can communicate with the interior of the fan ring and the volume provided radially within the fan ring, as a result of which interaction in terms of flow between the operating flow and the volume, which is provided radially within the fan ring, for generating the cooling air flow can be achieved. In particular, several, for example circular or slot-shaped, discharge openings are provided in the circumferential direction of the fan ring, preferably in a uniformly distributed manner. As an alternative, precisely one discharge opening running in the form of a slot in the circumferential direction is provided, the discharge opening preferably being continuously closed in the circumferential direction. The at least one discharge opening is provided in particular in the inner lateral surface of the fan ring and/or in a transition region between an end side of the fan ring facing counter to the flow direction of the cooling air flow and the inner lateral surface of the fan ring. A normal vector of the discharge opening can face inward in the radial direction, for example exclusively radially inward, at least with one component. The normal vector of the discharge opening preferably faces radially inward with one component and along the flow direction of the cooling air flow in the axial direction with another component. The operating flow can thereby prevent or at least reduce the formation of a boundary layer by way of the air otherwise forming the boundary layer from the volume provided radially within the fan ring in the interior of the fan ring being carried along by the air of the operating flow exiting via the discharge opening. A concentration of the flow lines of the cooling air flow in a radially internal area can be avoided or at least reduced in this way. It is even possible for the flow lines of the cooling air flow to diverge radially outward when passing the fan ring, as a result of which a correspondingly high negative pressure can be generated at the fan ring, this negative pressure allowing a correspondingly increased mass flow for the cooling air flow due to a correspondingly higher proportion of air carried along as a result of the suction jet effect.

The operating flow can flow in particular from an inlet opening of the fan ring communicating with the interior to the discharge opening of the fan ring communicating with the inner volume. In the circumferential direction of the fan ring, a partial volume flow of the operating flow can, preferably substantially tangentially, flow via the discharge opening into the radially inner volume in a circumferential angular region. As a result, the operating flow generates, owing to the suction jet effect, a sufficiently high pressure to carry along a portion of the volume provided radially within the fan ring, which in turn carries along further volume. The air discharged from the operating flow via the discharge opening can draw in further air by means of the suction jet effect, this further air combining with the air of the operating flow discharged via the discharge opening and becoming a portion of the jointly formed cooling air flow. The component of the operating flow flowing in the circumferential direction of the fan ring, which component does not leave the interior of the fan ring via the discharge opening in the circumferential angular range under consideration, can in particular take a substantially spiral flow path in the circumferential direction, so that a component of the operating flow flowing along an inner side of the fan ring with the highest possible flow velocity and/or almost parallel to the normal vector of the discharge opening can flow through the discharge opening.

The cooling air flow can strike at an angle and/or substantially perpendicular to the outer side of the transmission housing part and, by convective heat transfer, absorb and dissipate a quantity of heat from the heated transmission housing part. As a result, the heated transmission housing part can be cooled and absorb further heat generated in the transmission. In particular, the cooling air flow on the outer side of the transmission housing part can generate turbulent vortices, which facilitate convective heat dissipation.

The transmission housing part can cover rotating transmission elements provided in the interior of the transmission, in particular shafts and/or gears. The transmission housing part can be designed, for example, as a transmission cover covering a transmission opening of the transmission housing. For example, an entire side face of a transmission housing based on a cuboid shape is formed by the transmission housing part. The transmission housing part can also form a shell, in particular a top shell and/or a bottom shell of the transmission housing, and/or an annular housing frame. It is also possible for the outer side against which the cooling air flow flows to be formed by more than one transmission housing part. The transmission housing, which can be formed with the aid of the at least one transmission housing part, can in particular contain a cooling medium and/or lubricating medium, for example oil. The heat generated in the transmission during torque transmission can be absorbed by the medium, as a result of which the medium heats up. In turn, the medium can be moved from the rotating transmission elements to the transmission housing, where the medium can transfer the absorbed heat to the transmission housing and the cooled transmission housing part. The transmission housing part cooled by the cooling air flow can provide a large enough temperature gradient that the heat absorbed by the medium can be dissipated to the transmission housing part and from there to the cooling air flow. The transmission housing part is produced in particular from a metallic material, in particular a cast material, for example GJL 200, so that the transmission housing part can have a correspondingly high coefficient of thermal conductivity.

The volume provided radially within the fan ring is preferably free of fan internals. That is to say, there is no component that is connected to the fan ring and makes a contribution to conveying the cooling air flow radially within the fan ring. The volume provided radially within the fan ring is particularly preferably free of internals, that is to say other internals not interacting with the fan ring are not provided either. In particular, the minimum flow cross section of the cooling air flow corresponds substantially to a minimum opening area delimited by the fan ring. The volume provided radially within the fan ring is delimited in the radial direction by the fan ring and in the axial direction by the respective axial end of the fan ring. The volume provided radially within the fan ring can communicate with further volumes in both axial directions, so that inlet-side intake and outlet-side discharge of the cooling air flow with the lowest possible flow resistance is possible.

In particular, the conveying element is designed to draw in air from an inflow direction which is offset by an angle α in relation to a flow direction of the cooling air flow, where in particular $45° \leq \alpha \leq 135°$, preferably $60° \leq \alpha \leq 120°$ and particularly preferably $\alpha = 90° \pm 5°$. The inflow direction of the air drawn in by the conveying element and the flow direction of the cooling air flow leaving the fan ring is preferably substantially horizontally oriented. The conveying element can thus draw in ambient air for the operating flow in the fan ring from a volume which is different from the volume from which the flow of the cooling air flow exiting from the discharge opening carries along ambient air by means of the suction jet effect. This can prevent the cooling air flow from being adversely affected by the air drawn in by the conveying element, as a result of which a correspondingly large volume flow for the cooling air flow can be achieved. For example, in a substantially cuboidal transmission housing, the conveying element can draw in air on a long side of the transmission housing and convey it to the fan ring provided on a short side of the transmission housing, which fan ring directs the cooling air flow offset by approximately 90° in relation to the inflow direction of the air drawn in by the conveying element substantially frontally to the short side and directs a proportion of the cooling air flow substantially parallel along the two long sides and/or a top side of the transmission housing. This allows a correspondingly high cooling capacity to be achieved.

The fan ring is preferably positioned in a manner spaced apart from the outer side of the transmission housing part in the axial direction of the fan ring by means of an intermediate space, wherein the fan ring is connected to the transmission housing part via at least one fastening bolt, which bridges the intermediate space, wherein the cooling air flow against the outer side of the transmission housing part can be deflected into the intermediate space for dissipating absorbed heat. The intermediate space between the fan ring and the transmission housing allows the cooling air flow to be dissipated and prevents stagnant flow. Since the forces acting on the fan ring are rather low, the at least one fastening bolt, which is preferably formed as a stepped bolt, can be designed to be correspondingly small, so that a flow resistance provided by the fastening bolt can be correspondingly low or even negligible. The axial extent of the intermediate space and the corresponding axial extent of the fastening bolt can be designed substantially on the basis of the flow ratios of the cooling air flow to be set.

It is particularly preferably provided that the at least one fastening bolt for providing a flow resistance which is low in comparison to a flat plate with the same flow cross section in the radial direction of the fan ring runs in a manner rounded in the radial direction of the ventilation ring and/or formed in the shape of a teardrop or wedge. In particular, a shaping of the fastening bolt that is aerodynamically favorable for the deflected cooling air flow is achieved as a result. The flow resistance of at least one fastening bolt can thus be minimized, as a result of which an intermediate space which is particularly narrow in the axial direction can be achieved. The installation space requirement can thus be further reduced.

In particular, the cooling air flow flows through the fan ring substantially in the axial direction of the fan ring, wherein the outer side of the transmission housing part has deflection elements for deflecting and/or dividing the cooling air flow arriving in an axial direction of the fan ring in at least one radial direction, in particular in a plurality of radial directions, of the fan ring, wherein in particular the deflection elements are formed by rounded recesses and/or rounded raised portions in the transmission housing part. The cooling air flow flowing axially through the fan ring is aligned in the axial direction of the fan ring with the transmission housing part to be cooled, so that air can flow substantially frontally against the transmission housing part to be cooled. The deflection elements can be designed, in particular, in one piece with the transmission housing part by corresponding designing of the transmission housing part. The three-dimensional shaping of the transmission housing part in the region of the outer side can achieve defined deflection of the cooling air flow with a correspondingly low flow resistance. This allows a particularly high temperature gradient to be maintained between the cooling air flow and the outer side, this allowing a high heat dissipation rate. In particular, when the transmission housing part is produced by metal casting, the three-dimensional design of the outer side with rounded recesses and raised portions can be readily achieved with the aid of a corresponding casting mold. However, it is also possible to create the rounded recesses and raised portions of the transmission housing part by means of a forming process.

A spoiler, in particular which protrudes in the axial direction of the fan ring toward the outer side of the housing part beyond the fan ring, for directing air from a volume provided radially outside the fan ring to the cooling air flow leaving the fan ring is preferably provided radially outside the fan ring, wherein in particular the spoiler is connected via at least one fastening web to a radially outward facing lateral surface and/or an end side of the fan ring facing in the axial direction. With the aid of the spoiler, the cooling air flow can draw in air from the volume provided radially outside the fan ring and add it to the volume flow of the cooling air flow leaving the fan ring. The spoiler can in particular be part of an air guide hood, with the aid of which the cooling air flow leaving the fan ring can be suitably directed onto the transmission housing. As a result, a suction jet effect of the cooling air flow occurring at the output end of the fan ring can be intensified. The spoiler can form an annular gap tapering in the flow direction of the cooling air flow, for example, between the outer lateral surface of the fan ring and the spoiler, so that the air volume drawn in via the annular gap from radially outside the fan ring can supply the cooling air flow with additional kinetic energy and can thereby accelerate the cooling air flow. This can increase the mass flow of the cooling air flow and improve the cooling effect.

A flow cross section of the fan ring particularly preferably expands in the axial direction of the fan ring along a flow direction of the cooling air flow for providing a Coandă effect. The expansion of the flow cross section of the fan ring is small enough to prevent the cooling air flow from pulling away from the inner lateral surface of the fan ring due to the Coandă effect. At the same time, the expansion of the flow cross section of the fan ring is large enough to allow a dynamic pressure to drop, as a result of which the greatest possible negative pressure can be generated to draw air into the volume provided radially within the fan ring.

In particular, a surface normal of the outer side of the transmission housing part is oriented substantially perpendicular to the flow direction of the cooling air flow leaving the fan ring. This allows substantially the entire flow cross section of the cooling air flow to strike the outer side of the transmission housing part, so that substantially the entire mass flow of the cooling air flow can make a contribution to cooling the transmission and a correspondingly high cooling capacity is established.

The transmission housing part preferably has at least one further outer side which is oriented at an angle, in particular of substantially 90°, in relation to the outer side, wherein the further outer side runs at least partially radially within the fan ring as viewed in the axial direction of the fan ring and/or a deflector is provided for deflecting and/or guiding the cooling air flow, in particular coming substantially from the outer side, to the further outer side. With reference to a center point of the fan ring, the further outer side and/or the deflector may be arranged in a common radius region with the fan ring running from the center point of the fan ring to a radial outer side of the fan ring, so that, when viewed in the axial direction, the further outer side and/or the deflector can at least partially be covered by the fan ring and/or its opening region delimited by the fan ring. The deflector can be formed, in particular, in one piece with the spoiler and/or can be part of an air guide hood, with the aid of which the cooling air flow leaving the fan ring can be suitably directed onto the transmission housing. In the case of an angular transmission housing part, the angled further outer side can also be cooled by the cooling air flow provided for the outer side. In particular, cooling air flows against the outer side substantially frontally along the normal direction of the outer side and against the further outer side substantially perpendicularly to the normal direction of the further outer side. If direct flow of the cooling air flow against the further outer side is not intended to be possible or intended to be only insufficiently possible, it is possible to deflect the cooling air flow arriving from the outside to be directed to the further outer side with the aid of the deflector in order to also achieve heat dissipation and cooling on the further outer side. The outer side and the further outer side are particularly preferably designed in one piece and part of the same transmission housing part, so that good heat transfer between the outer side and the further outer side is possible by heat conduction within the material of the transmission housing part. This can further improve the cooling capacity.

The fan ring is particularly preferably produced by an additive manufacturing process, in particular 3D printing, wherein guide elements for shaping the operating flow are formed in particular in the interior of the fan ring. Owing to the additive manufacturing process, in which layers additively applied in particular in the axial direction of the fan ring are provided one above the other, a comparatively complicated design of the interior of the fan ring can be achieved very easily. The shaping of the interior of the fan ring can be adapted in terms of flow to the desired flow shape of the operating flow. For example, guide elements protruding into the interior can be formed, these preventing unnecessary flow resistances. In addition, it is possible to individually adapt the fan ring for a variety of differently shaped transmission housings without providing a correspondingly high number of different injection molds. The fan ring can be produced in a cost-effective manner and with little storage for the necessary raw materials for individual manufacture and/or for small series too.

A further embodiment relates to a transmission having a transmission housing for housing rotating transmission elements, a transmission cooling device which can be formed and developed as described above, wherein the transmission housing has the at least one transmission housing part, a first shaft which is guided through the transmission housing and is connected to a rotatable first transmission element, and a second shaft which is guided through the transmission housing and is connected to a rotatable second transmission element, wherein the first transmission element and the second transmission element are indirectly or directly coupled in a torque-transmitting manner, wherein in particular a first axis of rotation of the first shaft and a second axis of rotation of the second shaft are oriented substantially perpendicular to each other. By indirectly generating the cooling air flow with the aid of the operating flow generated by the conveying element of the transmission cooling device in the hollow fan ring, good cooling can be achieved with a large flow cross section of the cooling air flow with a small installation space requirement, so that space-saving cooling of a transmission is possible.

In particular, the conveying element of the transmission cooling device is mechanically coupled to the first shaft, wherein in particular a conveying direction of the conveying element is oriented substantially parallel or perpendicular to the first axis of rotation of the first shaft. The conveying direction is a flow direction of the mass flow generated by the conveying element for the operating flow and flowing away from the conveying element. The energy for driving the conveying element can be diverted from the first shaft, which is used in particular as an input shaft. An electric drive of the conveying element can thus be saved. The transmission cooling device can thus be operated autonomously from an electrical power supply. In addition, it can be provided that the mass flow generated by the conveying device for the operating flow is proportional to the rotation speed of the first shaft during regular operation of the transmission, in which a substantially constant operationally warm state results, so that a high cooling capacity is automatically generated at a high rotation speed, when a high level of heat generation is expected in the transmission, and a low and energy-saving cooling capacity is automatically generated at a low rotation speed, when a low level of heat generation is expected in the transmission. This makes it possible to divert only as much mechanical power from the first shaft for the operation of the conveying element as is required for adequate cooling, so that an unnecessary impairment of the efficiency of the transmission is avoided. The conveying element can be coupled in particular with a suitable transmission ratio to the first shaft in order to be able to provide a corresponding suitable cooling capacity for different rotation speed ranges of the first shaft. The conveying element can be decoupled from the first shaft via a coupling device, for example in order to achieve the operationally warm state as quickly as possible in a start-up phase, losses in the degree of efficiency being avoided in the operationally warm state due to an oil that is still viscous in the cold state. A thermocouple, for example a bimetal, is preferably provided, which automatically couples the conveying element to the first shaft above a limit temperature with the aid of the coupling device and automatically decouples the conveying element below the limit temperature. In particular, the thermocouple can be operated autonomously, that is to say without external electrical energy.

The first shaft or the second shaft is preferably guided radially on the inside through the fan ring, wherein in particular the shaft, which is guided through the fan ring, has a propeller for accelerating the cooling air flow along its flow direction. A substantially annular volume, which can be used to generate the cooling air flow, remains between the shaft guided through the fan ring and the fan ring. Since the shaft is a rotating component, the propeller connected to the shaft in a rotationally fixed manner can assist in generating the cooling air flow. The cooling air flow can thus be directed at a passage of the shaft through the transmission housing, so that good cooling is also achieved in the region of a bearing supporting the shaft, in particular rolling bearings.

The in particular substantially cuboidal transmission housing particularly preferably has a short side face and a long side face compared to the short side face, wherein the fan ring is provided on the short side face and the conveying element is provided on the long side face. The transmission housing can be based in particular on a cuboid base body, wherein in particular the short side face and the long side face are oriented substantially perpendicular to each other. In particular, the short side face and the long side face are provided in a common vertical height range and/or have a substantially equal extent in a vertical height direction. The long side face can have a longer extent in the horizontal direction than the short side face. At least a portion of the cooling air flow flowing onto the short side face can strike the short side face substantially frontally and/or another portion can flow substantially in the horizontal direction along the long side face, without the cooling air flow leaving the fan ring being adversely affected by the air drawn in by the conveying element. This results in a high cooling capacity.

In particular, one side face of the transmission housing is formed by more than one transmission housing part. For example, one of the side faces, in particular a side face on which the fan ring is provided, can be formed by two transmission housing parts. In particular, the side face against which the cooling air flow flows substantially frontally is formed by a lower housing shell and an upper housing shell of the transmission housing. In addition or as an alternative, a transmission housing part may be provided with an opening on a side face, the opening being closed by a cover formed by a further transmission housing part. Even if there is a thermal resistance between the at least two transmission housing parts, for example due to a seal provided between the transmission housing parts, the cooling air flow can flow against the entire side face and thus also the two transmission housing parts and cool them, so that the thermal resistance between the transmission housing parts does not adversely affect the heat dissipation.

A further aspect of the invention relates to an industrial application. The industrial application can have a drive means which can be designed, for example, as an electrical machine, an internal combustion engine or a hydraulic motor. The drive means can be coupled to a transmission for converting a torque and a rotation speed of the power generated by the drive means, wherein the transmission can be formed and developed as described above. The transmission of the industrial application can, in turn, be coupled in a torque-transmitting manner to a mechanical application in which mechanical energy introduced via the transmission unit can be used. The mechanical application is, for example, a conveyor belt, with the aid of which recyclable materials from, possibly previously separated and/or sorted, waste or the like can be fed to a crusher. By indirectly generating the cooling air flow with the aid of the operating flow generated by the conveying element of the transmission cooling device in the hollow fan ring, good cooling can be achieved with a large flow cross section of the cooling air flow with a small installation space requirement, so that space-saving cooling of the industrial application is possible.

BRIEF DESCRIPTION OF THE DRAWING

The invention will be explained below by way of example with reference to the accompanying drawings using preferred embodiments, wherein the features shown below can each represent an aspect of the invention both individually and in combination. If a feature is presented in combination with another feature in the specific exemplary embodiment, this serves only for simplified illustration of the invention using the exemplary embodiment and is in no way intended to mean that this feature cannot also be a development of the invention without the other feature, the scope of protection of the invention being defined by the independent claims. In the drawings:

DETAILED DESCRIPTION OF PREFERRED EMBODIMENTS

Figure 1:
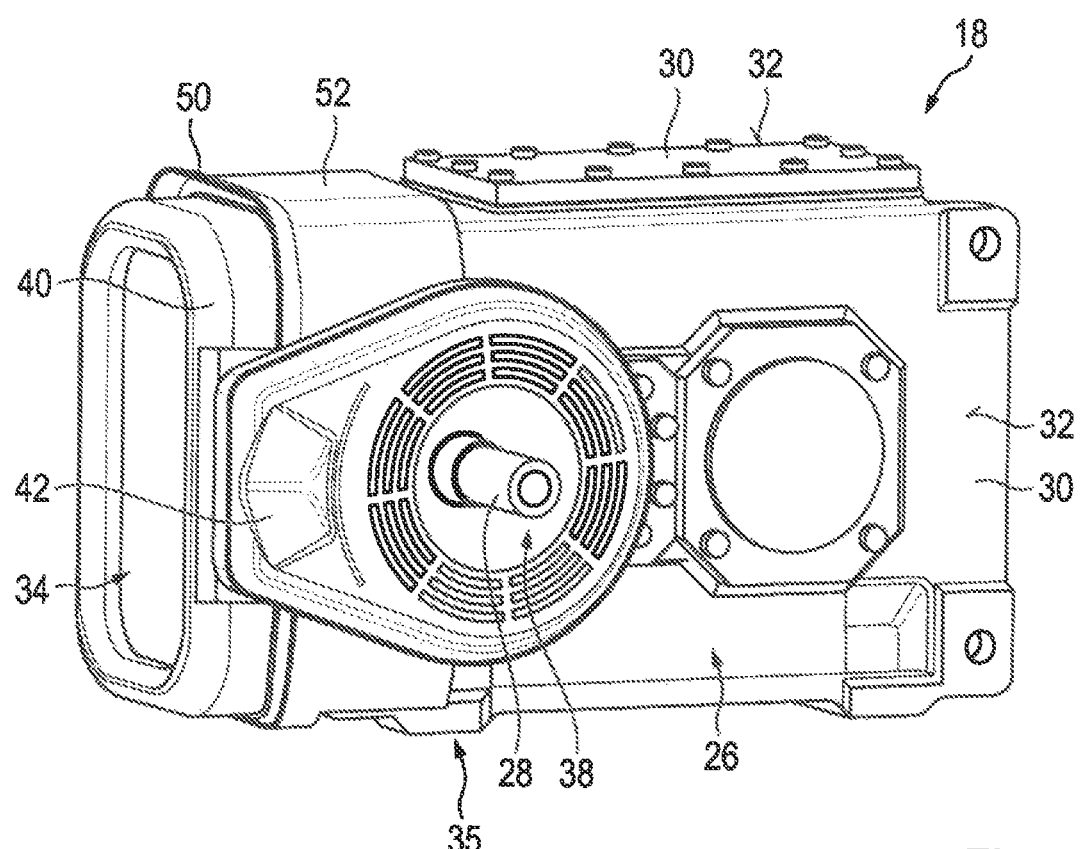
FIG. 1: shows a schematic perspective view of a transmission.
Figure 2:
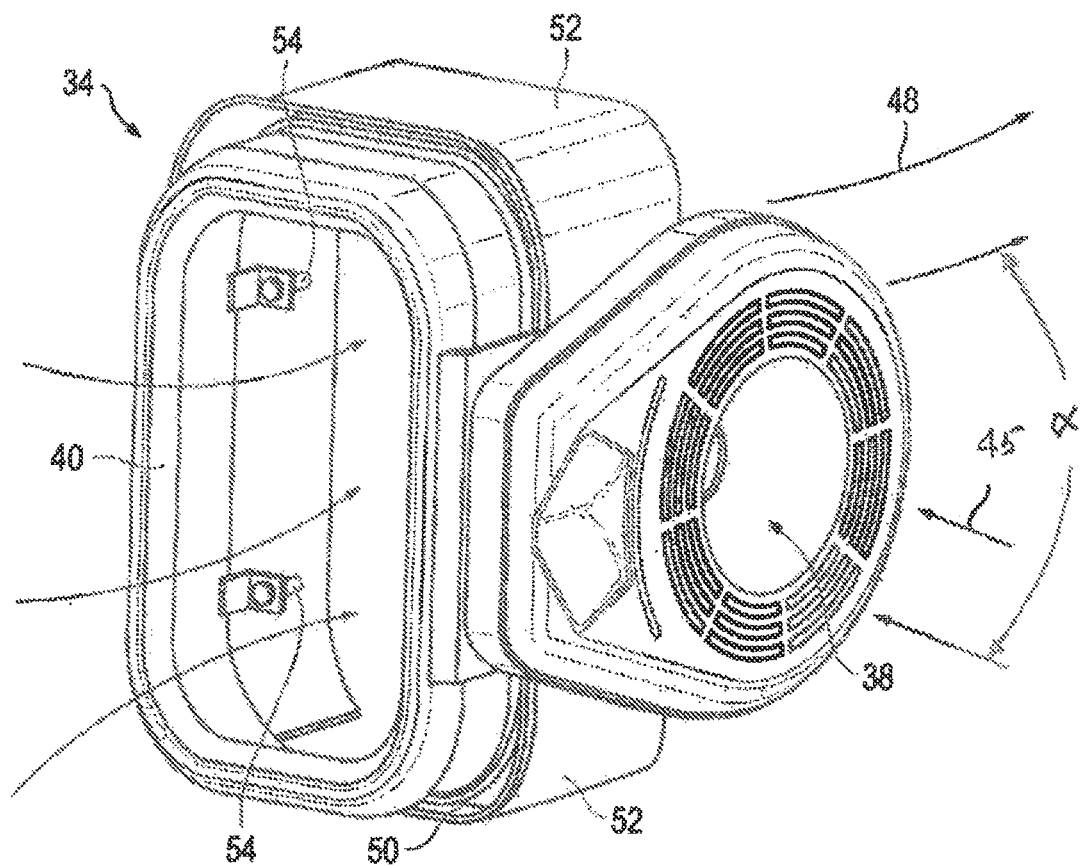
FIG. 2: shows a schematic perspective front view of a fan of a transmission cooling device for the transmission from FIG. 1, FIG. 3: shows a schematic perspective back view of the fan from FIG. 2, and FIG. 4: shows a schematic sectioned view of a detail of a fan ring 5 of the transmission cooling device from FIG. 2 and FIG. 3.
Figure 3:
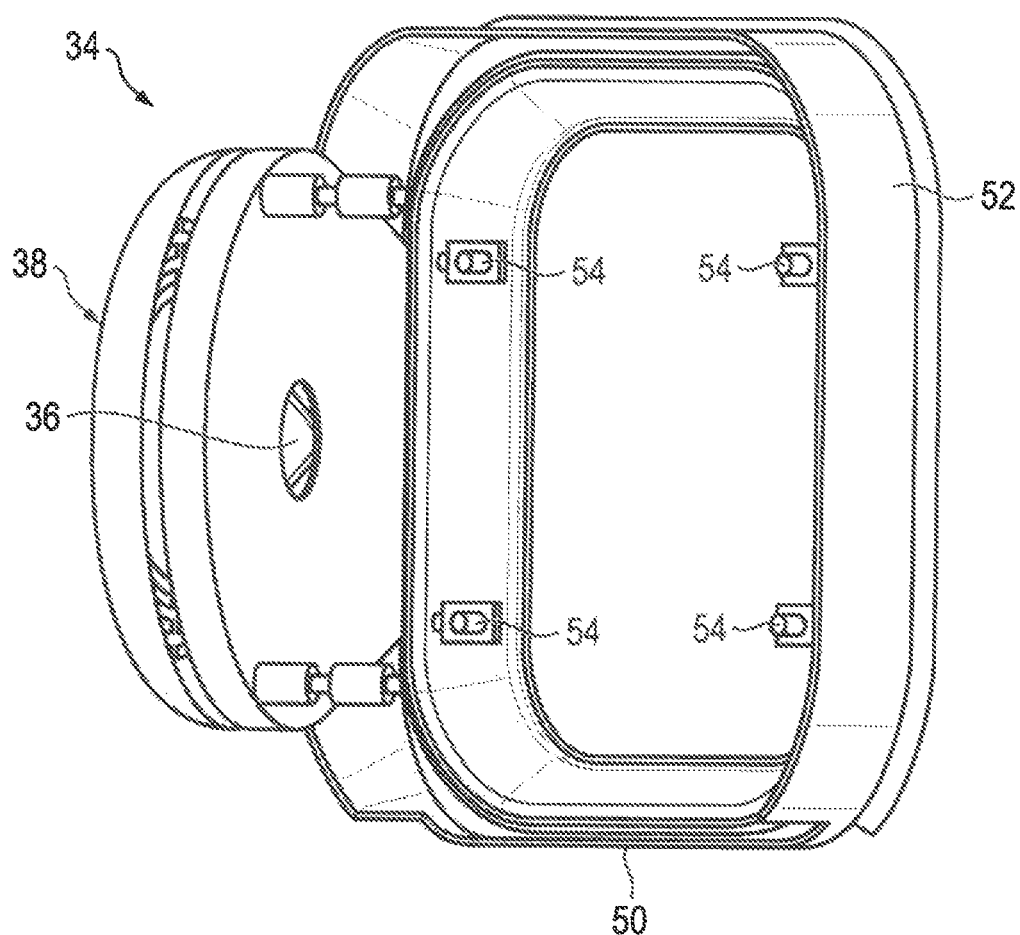

The transmission 18 shown in FIG. 1 has a transmission housing 26, through which a first shaft 28 designed, for example, as an input shaft can enter and a second shaft designed as an output shaft can exit. The transmission housing 26 has a plurality of transmission housing parts 30 which are connected to each other and each of which has an outer side 32 facing away from the interior of the transmission housing 26. For example, the transmission housing parts 30 are designed as a lower housing shell, an upper housing shell, a lateral bearing cover and an upper inspection cover. A one-part transmission housing is shown in the illustrated exemplary embodiment. A fan 34, shown in more detail in FIG. 2 and FIG. 3, is provided, for example, on a transmission housing part 30 which forms at least one part of a short side face of the transmission housing 26, the fan forming a transmission cooling device 35 together with the transmission housing part 30 against which air from the fan 34 flows. The short side face of the transmission housing 26 can be composed, in two parts, of the lower housing shell and the upper housing shell, with the short side face being designed in one part in the illustrated exemplary embodiment.

Figure 4:
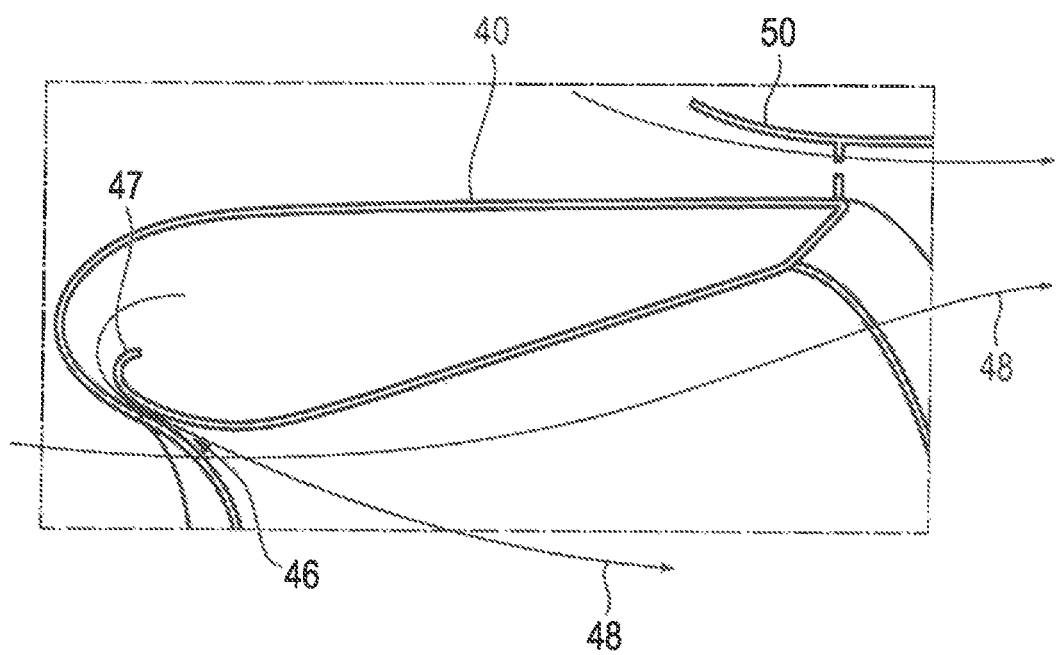

The fan 34 can have a conveying element 36 which is designed, for example, as a conveying wheel of an axial-radial fan 38 which can draw in ambient air with an Inflow direction 45 directed substantially frontally onto a long side face of the transmission housing 26. The conveying element 36 can be purely mechanically driven, in particular by the first shaft 28. The conveying element 36 can supply the drawn-in air to the hollow fan ring 40 via a first connecting channel 38 and/or a second connecting channel 42. As shown in FIG. 4, guide elements 47 are formed in the interior of the fan ring so that the operating flow generated in the hollow fan ring 40 can generate a cooling air flow 48 owing to a suction jet effect as it exits via a discharge opening 46. The discharge opening 46 is designed in particular as an annular gap that is continuous in the circumferential direction of the fan ring 40. The fan ring 40 can expand slightly in the flow direction in order to produce a Coandă effect of the cooling air flow 48 on the fan ring 40. The cooling air flow 48 can also draw in air radially outside the fan ring 40 by means of the suction jet effect with the aid of a spoiler 50. The cooling air flow 48 can be fed substantially frontally to the outer side 32 of the transmission housing part 30 provided in the flow path of the cooling air flow 48 in order to dissipate heat generated in the transmission 18. The cooling air flow 48 can be deflected substantially through 90° in the radial direction from the outer side 32 of the transmission housing part 30 and directed to another outer side 32 of another transmission housing part 30, which is provided, for example, on the top side and/or on a long side of the transmission housing 26, preferably with the aid of at least one deflector 52. The deflector 52 can be connected in particular to the spoiler 50 and/or designed in one piece with the spoiler 50. The spoiler 50 and the deflector 52 can together form an air guide hood, with the aid of which the cooling air flow 48 can flow along the long outer sides of the transmission housing 26.

As shown in FIG. 2 and FIG. 3, the fan ring 40 can be attached to the outer side 32 of the associated transmission housing part 30 by means of fastening bolts 54 designed as screw connections. An axial distance between the fan ring 40 and the transmission housing part 30 can also be prespecified with the aid of the fastening bolts 54 in order to provide an intermediate space between the fan ring 40 and the transmission housing part 30, the cooling air flow 48 being able to be discharged from the cooled transmission housing part 30 via the intermediate space.

The invention claimed is:

1. A transmission cooling device, comprising:
   a transmission housing part designed to house rotating transmission elements;
   a fan connected to the transmission housing part for providing a cooling air flow against an outer side of the transmission housing part, said fan including a conveying element; and
   a hollow fan ring in fluid communication with the conveying element for generating an operating flow within the fan ring, said fan ring fluidically communicating via a discharge opening with a volume which is provided radially within the fan ring and through which the cooling air flow is able to flow, said discharge opening being oriented in such a way that the operating flow, which flows out via the discharge opening, generates the cooling air flow by a suction jet effect.

2. The transmission cooling device of claim 1, wherein the conveying element is designed to draw in air from an inflow direction which is offset by an angle α in relation to a flow direction of the cooling air flow.

3. The transmission cooling device of claim 2, wherein the angle α is defined as 60°≤α≤120°.

4. The transmission cooling device of claim 2, wherein the angle α is 90°±5°.

5. The transmission cooling device of claim 2, wherein the angle α is defined as 45°≤α≤135°.

6. The transmission cooling device of claim 1, wherein the fan ring is positioned in spaced-apart relation from the outer side of the transmission housing part in an axial direction of the fan ring to define an intermediate space, and further comprising a fastening bolt designed to bridge the intermediate space for connecting the fan ring to the transmission housing part.

7. The transmission cooling device of claim 6, wherein the fastening bolt has in a radial direction of the fan ring a shape to provide a flow resistance which is lower than a flow resistance of a flat plate of a same flow cross section.

8. The transmission cooling device of claim 1, further comprising a spoiler provided radially outside the fan ring and protruding in an axial direction of the fan ring toward the outer side of the housing part beyond the fan ring for directing air from a volume provided radially outside the fan ring toward the cooling air flow leaving the fan ring.

9. The transmission cooling device of claim 1, wherein the fan ring has a flow cross section which expands in an axial direction of the fan ring along a flow direction of the cooling air flow for providing a Coandă effect.

10. The transmission cooling device of claim 1, wherein a surface normal of the outer side of the transmission housing part is oriented substantially perpendicular to a flow direction of the cooling air flow leaving the fan ring.

11. The transmission cooling device of claim 1, wherein the fan ring is produced by an additive manufacturing process, and further comprising guide elements formed in an Interior of the fan ring for shaping the operating flow.

12. The transmission cooling device of claim 1, wherein the fan ring is produced by 3D printing.

13. A transmission, comprising:
   a transmission housing;
   a first shaft guided through the transmission housing for connection to a transmission element; and
   a transmission cooling device comprising a fan connected to a transmission housing part of the transmission housing for providing a cooling air flow against an outer side of the transmission housing part, said fan including a conveying element and a hollow fan ring in fluid communication with the conveying element for generating an operating flow within the fan ring, said fan ring fluidically communicating via a discharge opening with a volume which is provided radially within the fan ring and through which the cooling air flow is able to flow, said discharge opening being oriented in such a way that the operating flow, which flows out via the discharge opening, generates the cooling air flow by a suction jet effect.

14. The transmission of claim 13, wherein the conveying element of the transmission cooling device is mechanically coupled to the first shaft.

15. The transmission of claim 13, wherein the first shaft is guided radially on an inside through the fan ring.

16. The transmission of claim 13, wherein the transmission housing has a short side face and a long side face that is longer than the short side face, said fan ring being provided on the short side face and said conveying element being provided on the long side face.

17. The transmission of claim 13, wherein the transmission housing has a substantially cuboidal shape.

* * * * *